(12) United States Patent
Hoffer

(10) Patent No.: US 9,421,611 B2
(45) Date of Patent: Aug. 23, 2016

(54) COMPOSITE CUTTING INSERT AND METHOD OF MAKING SAME

(71) Applicant: Kennametal Inc., Latrobe, PA (US)

(72) Inventor: Brad Daniel Hoffer, White, PA (US)

(73) Assignee: KENNAMETAL INC., Latrobe, PA (US)

( * ) Notice: Subject to any disclaimer, the term of this patent is extended or adjusted under 35 U.S.C. 154(b) by 222 days.

(21) Appl. No.: 14/200,350

(22) Filed: Mar. 7, 2014

(65) Prior Publication Data

US 2015/0251251 A1    Sep. 10, 2015

(51) Int. Cl.
| | | |
|---|---|---|
| *B23B 27/14* | (2006.01) | |
| *B22F 3/12* | (2006.01) | |
| *B22F 7/06* | (2006.01) | |
| *C22C 29/00* | (2006.01) | |
| *C22C 29/06* | (2006.01) | |

(52) U.S. Cl.
CPC .............. *B22F 3/12* (2013.01); *B23B 27/145* (2013.01); *B22F 7/06* (2013.01); *B23B 2200/3681* (2013.01); *B23B 2222/28* (2013.01); *B23B 2224/12* (2013.01); *B23B 2224/20* (2013.01); *B23B 2224/28* (2013.01); *C22C 29/00* (2013.01); *C22C 29/06* (2013.01); *C22C 2204/00* (2013.01); *Y10T 407/1904* (2015.01); *Y10T 407/1924* (2015.01); *Y10T 407/27* (2015.01)

(58) Field of Classification Search
CPC ..... B22F 3/12; B22F 7/06; B23B 2200/3681; B23B 2222/28; B23B 2224/12; B23B 2224/20; B23B 2224/28; B23B 27/145; Y10T 407/1904; Y10T 407/1924; Y10T 407/26; Y10T 407/27

USPC ..................... 407/32, 42, 118, 119
See application file for complete search history.

(56) References Cited

U.S. PATENT DOCUMENTS

| | | | |
|---|---|---|---|
| 3,254,392 A | * | 6/1966 | Novkov ................. B23B 27/04 407/113 |
| 4,448,591 A | | 5/1984 | Ohno |
| 4,484,560 A | | 11/1984 | Tanigawa |
| 4,522,633 A | | 6/1985 | Dyer |
| 4,525,178 A | | 6/1985 | Hall |
| 4,680,526 A | | 7/1987 | Okuyama et al. |
| 4,690,691 A | | 9/1987 | Komanduri |
| 4,784,023 A | * | 11/1988 | Dennis ..................... B22F 7/06 175/428 |
| 4,866,885 A | | 9/1989 | Dodsworth |

(Continued)

FOREIGN PATENT DOCUMENTS

| | | | |
|---|---|---|---|
| AT | WO 2004098818 A2 | * 11/2004 | ............. B22F 7/062 |
| BE | 1014066 A3 | 3/2003 | |

(Continued)

*Primary Examiner* — Daniel Howell
*Assistant Examiner* — Nicole N Ramos
(74) *Attorney, Agent, or Firm* — Larry R. Meenan

(57) ABSTRACT

A composite cutting insert includes a first portion made of a first composite material, a second portion made of a second composite material, and an intermediate portion interposed between the first and second portions and made of a third material. The intermediate portion has a two dimensional interlocking geometric shape. In one embodiment, the two-dimensional interlocking geometric shape is in the form of a mesh of interlocking links with evenly spaced, uniform small openings between the links. The interlocking geometric shape prevents movement of the first portion relative to the second portion. In addition, the openings allow the first and second composite materials to bond directly to each other.

21 Claims, 4 Drawing Sheets

(56) References Cited

U.S. PATENT DOCUMENTS

| | | | |
|---|---|---|---|
| 5,115,697 A | 5/1992 | Rodriguez et al. | |
| 5,366,522 A | 11/1994 | Nakamura et al. | |
| 5,564,511 A * | 10/1996 | Frushour | B23B 27/146 |
| | | | 175/431 |
| 5,709,907 A * | 1/1998 | Battaglia | B23B 27/146 |
| | | | 427/126.1 |
| 5,809,854 A * | 9/1998 | Thielen | B23B 27/007 |
| | | | 407/101 |
| 5,924,826 A | 7/1999 | Bystrom et al. | |
| 6,025,076 A | 2/2000 | Collins | |
| 6,068,913 A | 5/2000 | Cho et al. | |
| 6,146,060 A | 11/2000 | Rydberg et al. | |
| 6,409,435 B1 | 6/2002 | Kocherovsky et al. | |
| 6,892,836 B1 | 5/2005 | Eyre et al. | |
| 7,687,156 B2 | 3/2010 | Fang et al. | |
| 7,998,573 B2 | 8/2011 | Qian et al. | |
| 2003/0039523 A1 | 2/2003 | Kemmer | |
| 2003/0063955 A1 | 4/2003 | De Beaupre et al. | |
| 2003/0082021 A1 | 5/2003 | Minshall | |
| 2004/0101371 A1 | 5/2004 | Arvidsson et al. | |
| 2004/0234349 A1 | 11/2004 | Ueda et al. | |
| 2005/0158132 A1 | 7/2005 | Pantzar | |
| 2005/0230156 A1 | 10/2005 | Belnap et al. | |
| 2006/0216515 A1 | 9/2006 | Kazahaya et al. | |
| 2007/0292219 A1 * | 12/2007 | Craig | B23C 5/207 |
| | | | 407/48 |
| 2008/0226403 A1 * | 9/2008 | Craig | B23C 5/207 |
| | | | 407/113 |
| 2010/0272526 A1 * | 10/2010 | Dufour | B23B 27/141 |
| | | | 407/114 |
| 2011/0023375 A1 * | 2/2011 | Sani | B22F 3/24 |
| | | | 51/297 |
| 2011/0044774 A1 | 2/2011 | Gustavsson | |
| 2011/0259648 A1 * | 10/2011 | Sani | B22F 7/06 |
| | | | 175/428 |
| 2012/0121346 A1 | 5/2012 | Hacker et al. | |
| 2013/0315680 A1 * | 11/2013 | Ben Amor | B23C 5/1009 |
| | | | 407/32 |

FOREIGN PATENT DOCUMENTS

| | | | | |
|---|---|---|---|---|
| DE | 3405211 | A1 | 2/1984 | |
| DE | 3347501 | A1 * | 9/1985 | B22F 7/06 |
| DE | 3433184 | A1 * | 3/1986 | B23B 27/145 |
| DE | 4423861 | A1 | 2/1994 | |
| DE | 19937739 | A1 | 8/1999 | |
| FR | 2703610 | A1 | 4/1993 | |
| JP | 3044509 | U | 8/1997 | |
| SE | EP 0365505 | A1 * | 4/1990 | B22F 3/02 |
| ZA | CA 2476780 | A1 * | 8/2003 | B23B 27/141 |

* cited by examiner

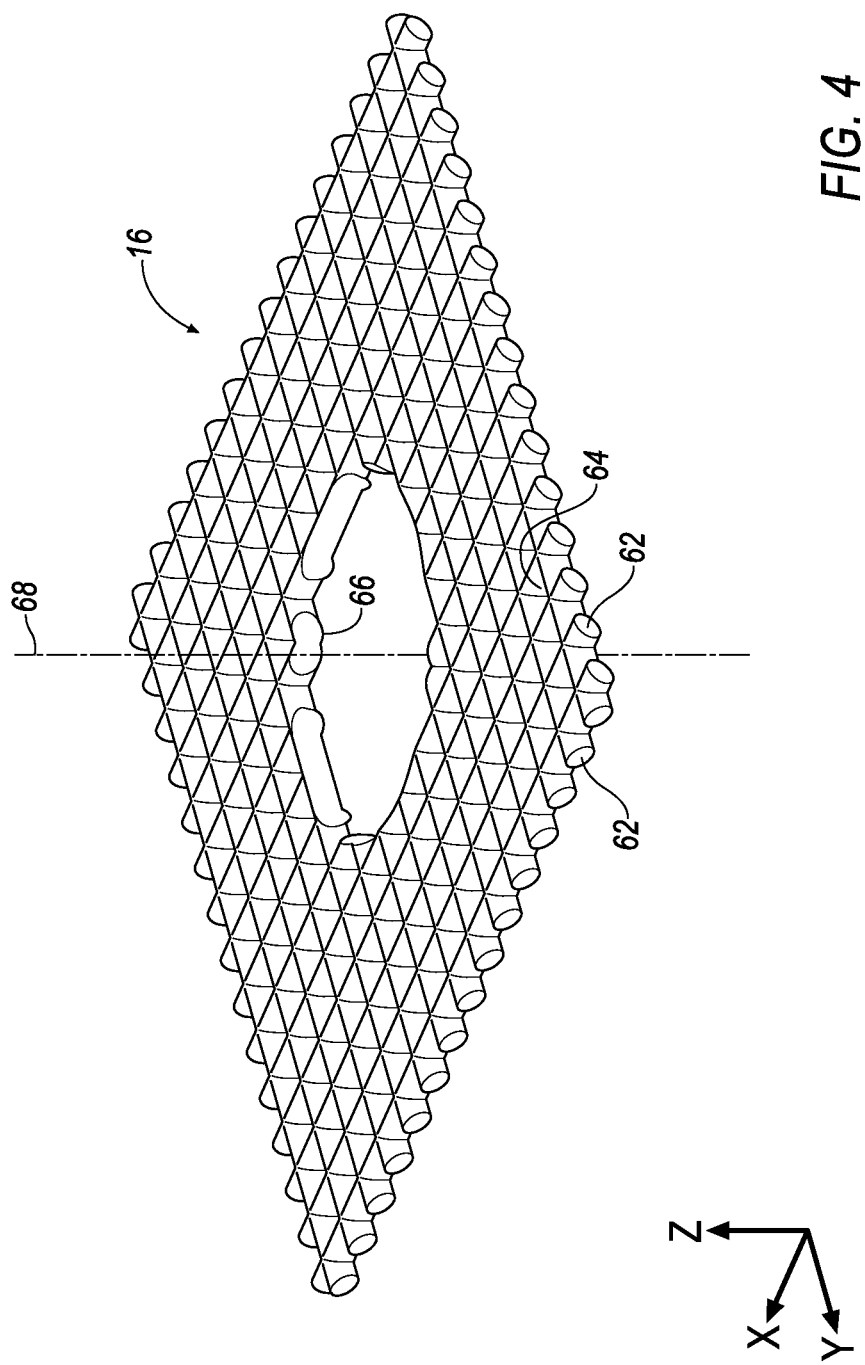

COMPOSITE CUTTING INSERT AND METHOD OF MAKING SAME

BACKGROUND OF THE INVENTION

1. Field of the Invention

The invention pertains to the field of cutting inserts. More particularly, the invention pertains to a composite cutting insert having an intermediate portion disposed between a first portion and a second portion, the intermediate portion having a two-dimensional interlocking geometric shape for preventing movement of the first portion relative to the second portion and a plurality of openings to allow the first portion to bond directly to the second portion.

2. Description of Related Art

Cutting inserts employed for metal machining are commonly fabricated from composite materials due to their attractive combinations of mechanical properties such as strength, toughness, and wear resistance compared to other tool materials such as tool steels and ceramics. Conventional cutting inserts made from composite materials, such as cemented carbides, are based on a "monolithic" construction, i.e., they are fabricated from a single grade of cemented carbide. In this manner, conventional monolithic cutting tools have the same mechanical and chemical properties at all locations throughout the tool.

Cemented carbides materials comprise at least two phases: at least one hard ceramic component and a softer matrix of metallic binder. The hard ceramic component may be, for example, carbides of any carbide forming element, such as titanium, chromium, vanadium, zirconium, hafnium, molybdenum, tantalum, tungsten, and niobium. A common example is tungsten carbide. The binder may be a metal or metal alloy, typically cobalt, nickel, iron or alloys of these metals. The binder "cements" the ceramic component within a matrix interconnected in three dimensions. Cemented carbides may be fabricated by consolidating a powdered metal of at least one powdered ceramic component and at least one powdered binder.

The physical and chemical properties of cemented carbide materials depend in part on the individual components of the metallurgical powders used to produce the material. The properties of the cemented carbide materials are determined by, for example, the chemical composition of the ceramic component, the particle size of the ceramic component, the chemical composition of the binder, and the ratio of binder to ceramic component. By varying the components of the metallurgical powder, tools, such as inserts, including indexable inserts, drills and end mills can be produced with unique properties matched to specific applications.

In applications of machining today's modern metal materials, enriched grades of carbide materials are often desired to achieve the desired quality and productivity requirements. However, cutting inserts fabricated from a monolithic carbide construction using the higher grades of cemented carbides are expensive to fabricate, primarily due to the high material costs. In addition, it is difficult to optimize the composition of the conventional monolithic indexable cutting inserts comprising a single grade of carbide material to meet the different demands of each location in the insert.

SUMMARY OF THE INVENTION

The problem of manufacturing a cutting insert made of different grades of carbide material is solved by providing an intermediate portion interposed between a first portion and a second portion, the intermediate portion having a two dimensional interlocking geometric shape for preventing movement of the first and second portions.

In one aspect of the invention, a composite cutting insert comprises a first portion made of a first composite material, a second portion made of a second composite material, and an intermediate portion interposed between the first and second portions and made of a third material, the intermediate portion having a two dimensional interlocking geometric shape for preventing movement of the first and second portions.

In another aspect of the invention, a composite cutting insert comprises a first portion made of a first composite material; a second portion made of a second composite material; and an intermediate portion interposed between the first and second portions and made of a third material, the intermediate portion comprising a mesh of interlocking links with evenly spaced, uniform small openings between the links for allowing the first portion to bond directly to the second portion.

In another aspect of the invention, a method for manufacturing a composite cutting insert comprises the steps of:
  filling a bottom portion of a die cavity with a second composite material;
  pressing the second composite material to form a finished geometric shape of a second portion of the composite cutting insert having an upper surface with a two-dimensional array of semi-circular grooves, a lower surface, and a plurality of side surfaces;
  sliding a third composite material into the die with side actuation;
  indexing and filling an upper portion of the die cavity with a first composite material;
  pressing the first composite material to form a finished geometric shape of a first portion of the composite cutting insert having and upper surface, a lower surface with a two-dimensional array of semi-circular grooves, a plurality of side surfaces, and a cutting edge defined at and intersection between the upper surface and each of the side surfaces; and
  sintering the first portion, the second portion and the intermediate portion at a temperature between 1400° C. and 2000° C. to form the composite cutting insert.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 4 is an isometric view of an intermediate portion of the composite cutting insert of FIG. 1 made of a third composite material.

DETAILED DESCRIPTION OF THE INVENTION

Figure 1:
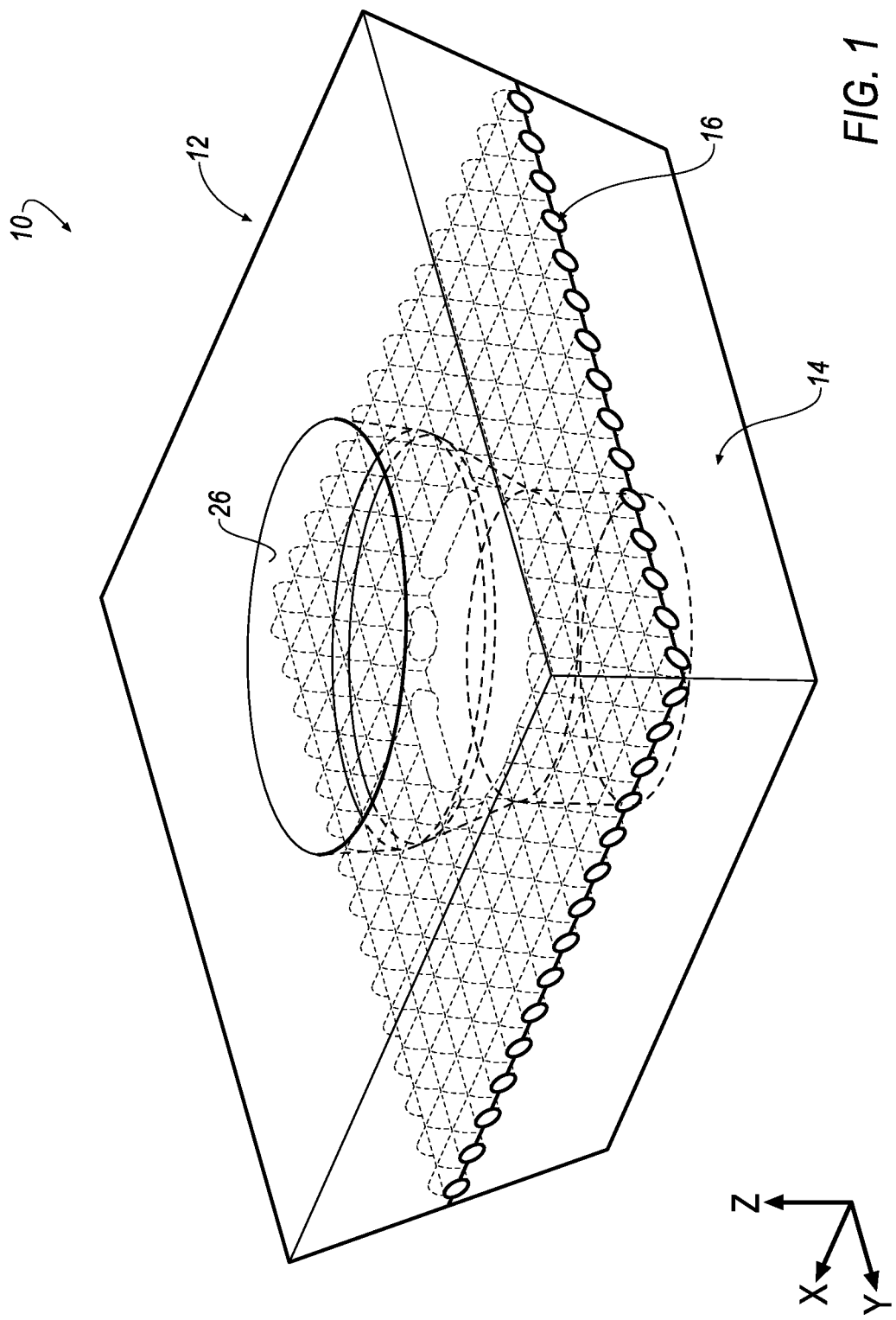
FIG. 1 is an isometric view of a composite cutting insert according to an embodiment of the invention.

The present invention provides composite articles, such as cutting inserts, rotary cutting inserts, drilling inserts, milling inserts, spade drills, spade drill inserts, ball nose inserts and method of making such composite articles. The composite articles, specifically composite inserts, may further comprise chip forming geometries on either the top or bottom surfaces, or on both the top and bottom surfaces. The chip forming geometry of the composite article may be a complex chip forming geometry. Complex chip forming geometry may be any geometry that has various configurations on the tool rake face, such as lumps, bumps, ridges, grooves, lands, back walls, or combinations of such features.

As used herein, "composite article" or "composite insert" refers to an article or cutting insert having discrete portions differing in physical properties, chemical properties, chemical composition and/or microstructure. These portions do not include mere coatings applied to an article or insert. These differences result in the portions differing with respect to at least one characteristic. The characteristic of the portions may be at least one of, for example, hardness, tensile strength, wear resistance, fracture toughness, modulus of elasticity, corrosion resistance, coefficient of thermal expansion, and coefficient of thermal conductivity. As used herein, a "composite material" is a material that is a composite of two or more phases, for example, a ceramic component in a binder, such as a cemented carbide. Composite inserts that may be constructed as provided in the present invention include inserts for turning, cutting, slotting, milling, drilling, reaming, countersinking, counterboring, end milling, and tapping of materials, for example.

The present invention more specifically provides composite articles and composite inserts having at least one cutting edge and at least two portions of composite materials that differ with respect to at least one characteristic. The composite inserts may further be indexable and/or comprise chip forming geometries. The differing characteristics may be provided by variation of at least one of the chemical composition and the microstructure among the two portions of cemented carbide material. The chemical composition of a portion is a function of, for example, the chemical composition of the ceramic component and/or binder of the portion and the carbide-to-binder ratio of the portion. For example, one of two cemented carbide portions of a rotary tool may exhibit greater wear resistance, enhanced hardness, and/or a greater modulus of elasticity than the other of the two portions.

Embodiments of the present invention include a method of producing a composite article comprising introducing a first powdered metal grade from a feed shoe into a first portion of a cavity in a die and a second powdered metal grade from the feed shoe into a second portion of the cavity, wherein the first powder metal grade differs from the second powdered metal grade in at least one characteristic. The powdered metal grade may then be consolidated to form a compact. The powdered metal grades may individually comprise hard particles, such as a ceramic component, and a binder material. The hard particles may independently comprise at least one of a carbide, a nitride, a boride, a silicide, an oxide, and solid solutions thereof. The binder may comprise at least one metal selected from cobalt, nickel, iron and alloys thereof. The binder also may comprise, for example, elements such as tungsten, chromium, titanium, tantalum, vanadium, molybdenum, niobium, zirconium, hafnium, ruthenium, palladium, and carbon up to the solubility limits of these elements in the binder. Additionally, the binder may contain up to 5 weight percent of elements such as copper, manganese, silver, aluminum, and ruthenium. One skilled in the art will recognize that any or all of the constituents of the cemented hard particle material may be introduced in elemental form, as compounds, and/or as master alloys. Further embodiments may include introducing a third powdered metal grade from the feed shoe into the cavity.

Sintering the compact will form a composite article having a first portion comprising a first composite material and a second portion comprising a second composite material, wherein the first composite material and the second composite material may be the same material, or differ in at least one material property. The material property in which the portions differ may be at least one of the group consisting of composition, grain size, modulus of elasticity, hardness, wear resistance, fracture toughness, tensile strength, corrosion resistance, coefficient of thermal expansion, and coefficient of thermal conductivity.

The first and second composite materials may individually comprise hard particles in a binder, wherein the hard particles independently comprise at least one of a carbide, a nitride, a boride, a silicide, an oxide, and solid solutions thereof and the binder material comprises at least one metal selected from cobalt, nickel, iron and alloys thereof. In certain embodiments, the hard particles may individually be a metal carbide. The metal of the metal carbide may be selected from any carbide forming element, such as titanium, chromium, vanadium, zirconium, hafnium, molybdenum, tantalum, tungsten, and niobium. The metal carbide of the first composite material may differ from the metal carbide of the second composite material in at least one of chemical composition and average grain size. The binder material of the first powdered metal grade and the binder of the second powdered metal grade may each individually comprise a metal selected from the group consisting of cobalt, cobalt alloy, nickel, nickel alloy, iron, and iron alloy. The first powdered metal grade and the second powdered metal grade may individually comprise 2 to 40 weight percent of the binder and 60 to 98 weight percent of the metal carbide by total weight of the powdered metal. The binder of the first powdered metal grade and the binder of the second powdered metal grade may differ in chemical composition, weight percentage of the binder in the powdered metal grade, or both. In some embodiments, the first powdered metal grade and the second powdered metal grade includes from 1 to 10 weight percent more of the binder than the other of the first powdered metal grade and the second powdered metal grade.

It will be apparent to one skilled in the art, however, that the following discussion of the present invention also may be adapted to the fabrication of composite inserts having more complex geometry and/or more than two portions. Thus, the following discussion is not intended to restrict the invention, but merely to illustrate embodiments of the invention.

In certain embodiments, the ceramic components may comprise less than 5% cubic carbides, such as tantalum carbide, niobium carbide and titanium carbide, or, in some applications less than 3 wt. % cubic carbides. In embodiments of the present invention, it may be advantageous to avoid cubic carbides or only include low concentrations of cubic carbides because cubic carbides reduce the strength transverse rupture strength, increase the production costs, and reduce the fracture toughness of the final article. This is especially important for tools used to machine hard work pieces where the machining results in a shearing action and the strength of the drill should be the greatest. Other disadvantages include reduced thermal-shock resistance due to a higher thermal-expansion coefficient and lower thermal conductivity and reduced abrasive wear resistance.

One skilled in the art, after having considered the description of present invention, will understand that the improved rotary tool of this invention could be constructed with several portions of different cemented carbide materials to produce a progression of the magnitude of one or more properties from an intermediate portion of the cutting insert to its periphery. A major advantage of the composite articles and composite inserts of the present invention is the flexibility available to the tool designer to tailor properties of portions of the tools to suit different applications. For example, the size, location, thickness, geometry, and/or physical properties of the individual cemented carbide material portions of a particular composite blank of the present invention may be selected to suit the specific application of the rotary tool fabricated from the blank. Thus, for example, the stiffness of one or more portions of the insert may be increased if the insert experiences significant bending during use. Such a portion may comprise a cemented carbide material having an enhanced modulus of elasticity, for example, or the hardness and/or wear resistance of one or more cemented carbide portions having cutting surfaces and that experience cutting speeds greater than other portions may be increased; and/or the corrosion resistance of portions of cemented carbide material subject to chemical contact during use may be enhanced.

Embodiments of the composite inserts may be optimized to have a surface portion of a carbide material of harder grade to achieve better wear resistance and the core portion as a carbide material of tougher grade to increase shock or impact resistance. Therefore, the composite indexable carbide cutting inserts made from the present invention have dual benefits in reduced manufacturing cost and improved machining performance.

Referring now to FIGS. 1-4, a composite cutting insert 10 is shown according to an embodiment of the invention. In general, the cutting insert 10 is generally square-shaped and comprises a first portion 12 made of a first composite material, a second portion 14 made of a second composite material, and an intermediate portion 16 interposed between the first and second portions 12, 14 and made of a third composite material.

As described above, the first and second composite materials can be made of the same or different composite material. However, the third composite material has at least one different material property than either the first and second composite materials. In addition, the third material is made of material that allows the first and second composite materials to sufficiently bond thereto. In one embodiment, the third material can comprise a cemented carbide composite material having at least one material property that is different from the first and second composite materials. For example, the third composite material may be made of a cemented carbide composite material having a higher shrinkage rate than the first and second composite materials to cause the particles to move closer together and produce a material that is less porous than the first and second composite materials. As a result, the higher shrinkage rate allows for the third material to place the residual stress into compression.

Figure 2:
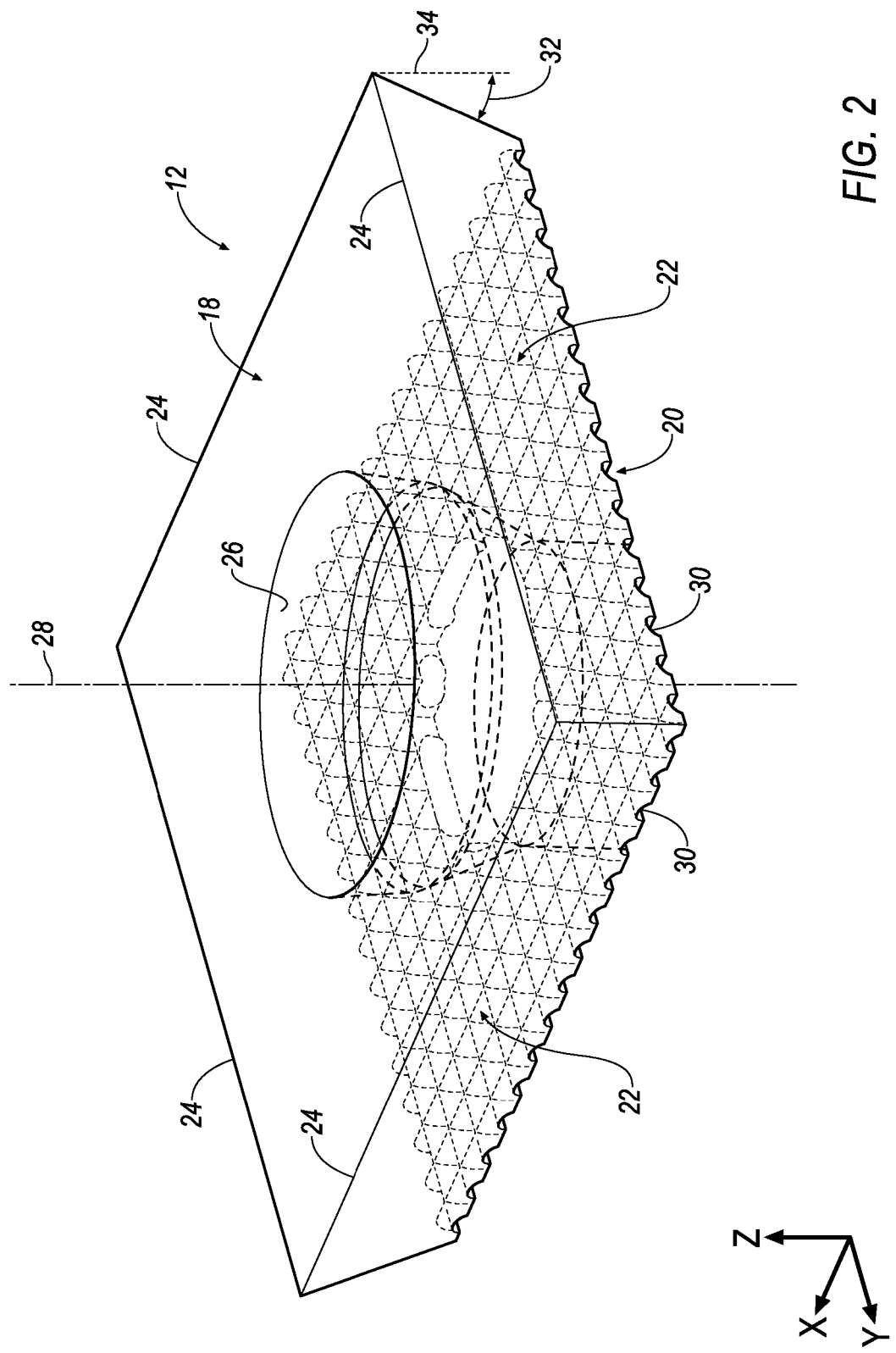
FIG. 2 is an isometric view of a first portion of the composite cutting insert of FIG. 1 made of a first composite material.

Referring now to FIG. 2, the first portion 12 has an upper surface 18, a lower surface 20, and a plurality of side surfaces 22 joining the upper surface 18 and the lower surface 20. A cutting edge 24 is defined at the intersection between the upper surface 18 and each of the side surfaces 22. Thus, the cutting insert 10 has a total of four cutting edges 24. The first portion 12 may also include a central hole 26 extending from the upper surface 18 to the lower surface 20 for accommodating a mounting screw (not shown). The central hole 26 is optional and can be omitted, depending on the method for mounting the cutting insert 10 to a tool holder (not shown). The first portion 12 has a central axis 28 that is parallel to the z-axis. As seen in FIG. 2, each side wall 22 forms a clearance angle 32 with respect to a plane 34 that is parallel to the central axis 28.

One aspect of the invention is that the lower surface 20 has a two-dimensional array of identical-shaped semi-circular grooves 30. In the illustrated embodiment, the grooves 30 extend across from one side surface 22 to an opposite side surface 22 parallel to both the x- and y-axes (i.e. perpendicular to the central axis 28). The purpose of the two-dimensional array of grooves 30 is to accommodate the intermediate portion 16 and allow the intermediate portion 16 to prevent movement of the first and second portions 12, 14 of the cutting insert 10. Although the illustrated embodiment shows a two-dimensional array of semi-circular shaped grooves 30, it will be appreciated that the principles of the invention can be practiced with any shape of grooves that are complementary in shape to the intermediate portion 16 and will prevent movement of the first and second portions 12, 14. For example, the grooves 30 can be triangular-shaped, and the like.

Figure 3:
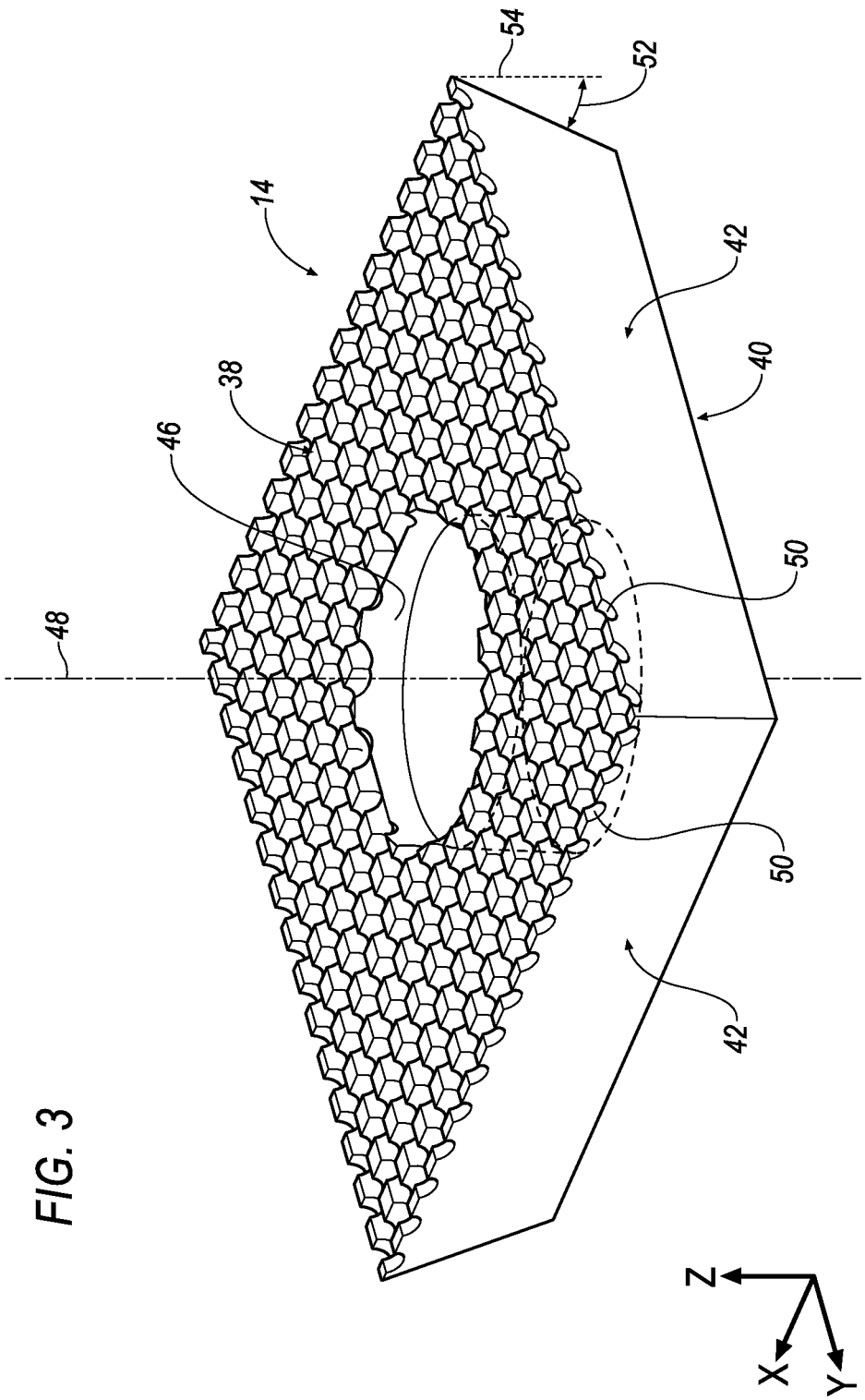
FIG. 3 is an isometric view of a second portion of the composite cutting insert of FIG. 1 made of a second composite material.

Referring now to FIG. 3, the second portion 14 has an upper surface 38, a lower surface 40, and a plurality of side surfaces 42 joining the upper surface 38 and the lower surface 40. The second portion 14 may also include a central hole 46 extending from the upper surface 38 to the lower surface 40 for accommodating a mounting screw (not shown). The central hole 46 is optional and can be omitted, depending on the method for mounting the cutting insert 10 to a tool holder (not shown). The second portion 14 has a central axis 48 that is parallel to the z-axis. As seen in FIG. 3, each side wall 42 forms a clearance angle 52 with respect to a plane 54 that is parallel to the central axis 48. In the illustrated embodiment, the clearance angle 52 of the second portion 14 is equal to the clearance angle 32 of the first portion 12.

One aspect of the invention is that the upper surface 38 has a two-dimensional array of identical-shaped semi-circular grooves 50, similar in shape to the grooves 30 of the first portion 12. In the illustrated embodiment, the grooves 50 extend across from one side surface 42 to an opposite side surface 42 parallel to both the x- and y-axes (i.e. perpendicular to the central axis 48). Similar to the first portion 12, the purpose of the two-dimensional array of grooves 50 of the second portion 14 is to accommodate the intermediate portion 16 and allow the intermediate portion 16 to prevent movement of the first and second portions 12, 14 of the cutting insert 10. Although the illustrated embodiment shows a two-dimensional array of semi-circular shaped grooves 50, it will be appreciated that the principles of the invention can be practiced with any shape of grooves that are complementary in shape to the intermediate portion 16 and will prevent movement of the first and second portions 12, 14. For example, the grooves 50 can be triangular-shaped, and the like.

Referring now to FIG. 4, the intermediate portion 16 has a two-dimensional interlocking geometric shape for preventing movement of the first and second portions 12, 14. In the illustrated embodiment, the two-dimensional interlocking geometric shape is in the form of a mesh of interlocking links 62 with evenly spaced, uniform small openings 64 between the links 62. The interlocking geometric shape prevents the movement of the first portion 12 relative to the second portion 14. In addition, the openings 64 allow the first and second composite materials of the first and second portions 12, 14 to bond directly to each other. The intermediate portion 16 may also include a central hole 66 for accommodating a mounting screw (not shown). The central hole 66 is optional and can be omitted, depending on the method for mounting the cutting insert 10 to a tool holder (not shown). The intermediate portion 16 has a central axis 68 that is parallel to the z-axis.

In the illustrated embodiment, the links 62 extend in both directions that are perpendicular to the central axis 68 (i.e.

parallel to both the x- and y-axes). The links 62 are complementary in shape to the shape of the grooves 30, 50 of the first and second portions 12, 14. In the illustrated embodiment, the links 62 are circular in cross-sectional shape to provide the maximum amount of contact area with the first and second portions 12, 14. However, it will be appreciated the invention is not limited by the geometric shape of the links 62, and that the invention can be practiced with any desirable shape, such as triangular, and the like.

As mentioned above, the first and second portions 12, 14 can be made of the same or different ceramic composite material. However, the intermediate portion 16 is made of a third composite material that has at least one different material property than either the first and second composite materials. In addition, the third composite material is made of material that allows the first and second composite materials to sufficiently bond thereto. In one embodiment, the third composite material can comprise a cemented carbide composite material having at least one material property that is different from the first and second composite materials. For example, the third composite material may be made of a cemented carbide composite material having a higher shrinkage rate than the first and second composite materials to cause the particles to more closer together and produce a material that is less porous than the first and second materials. As a result, the higher shrinkage rate allows for the third material to place the residual stress into compression.

A method of manufacturing the cutting insert 10 will now be described. In general, the manufacturing method used to create the novel composite carbide indexable cutting inserts of the invention is based on conventional carbide powder processing methods. In an embodiment of the method of the invention, the powdered metal grades may be introduced into a portion of a cavity of a die by a single feed shoe or multiple feed shoes. In certain embodiments, at least one of the feed shoes may comprise at least two feed sections to facilitate filling of each portion of the cavity with the same shoe. Embodiments of the method may further include introducing partitions into the cavity to form the portions of the cavity of the die. The partitions may be attached to the shoe or introduced into the cavity by another portion of the apparatus. The partitions may be lowered into the cavity by a motor, hydraulics, pneumatics or a solenoid.

First, a bottom portion of the die is filled with the second composite material for the second portion 14 of the cutting insert 10. Then, the second composite material is pressed to form the finished shape of the second portion 14 with the upper surface 38 with the two-dimensional array of semi-circular grooves 50, the lower surface 40, and the plurality of side surfaces 42. The central hole 46 may also be formed during this step, if desired. Next, the third composite material for the intermediate portion 16 is slid into the die with side actuation. Then, the top ram is indexed to the final geometric shape of the first portion 12, if desired. Then, the top portion of the die is filled with the first composite material and pressed to form the finished shape of the first portion 12 with the upper surface 18, the lower surface 20 with the two-dimensional array of semi-circular grooves 30, and the plurality of side surfaces 22. The central hole 26 may also be formed during this step, if desired. The intermediate portion 16 can be inserted numerous times, and filled over with another layer of the first composite material, if desired. Then, the first, second and third composite materials are sintered at a temperature between about 1400° C. and about 2000° C. to form the finished product.

In an alternate embodiment, the first and second composite materials for the first and second portions 12, 14 and the third composite material for the intermediate portion 16 can all be added to the die, and then all three materials are pressed in a single step.

The patents and publications referred to herein are hereby incorporated by reference.

Having described presently preferred embodiments the invention may be otherwise embodied within the scope of the appended claims.

What is claimed is:

1. A composite cutting insert, comprising:
   a first portion made of a first composite material;
   a second portion made of a second composite material; and
   an intermediate portion interposed between the first and second portions and made of a third material, the intermediate portion having a two dimensional interlocking geometric shape for preventing movement of the first and second portions,
   wherein the intermediate portion comprises a mesh of interlocking links with openings between the links.

2. The composite cutting insert according to claim 1, wherein the openings between the links are evenly spaced and uniform.

3. The composite cutting insert according to claim 2, wherein the links are circular in cross-sectional shape.

4. The composite cutting insert according to claim 1, wherein the first composite material has a different material property than the second composite material.

5. The composite cutting insert according to claim 1, wherein the first portion comprises an upper surface, a lower surface, a plurality of side surfaces joining the upper surface and the lower surface, and a cutting edge defined at the intersection between the upper surface and each of the side surfaces.

6. The composite cutting insert according to claim 5, wherein the lower surface has a two-dimensional array of identical-shaped semi-circular grooves extending across from one side surface to an opposite side surface.

7. The composite cutting insert according to claim 1, wherein the second portion comprises an upper surface, a lower surface, a plurality of side surfaces joining the upper surface and the lower surface.

8. The composite cutting insert according to claim 7, wherein the upper surface has a two-dimensional array of identical-shaped semi-circular grooves extending across from one side surface to an opposite side surface.

9. A composite cutting insert, comprising:
   a first portion made of a first composite material;
   a second portion made of a second composite material; and
   an intermediate portion interposed between the first and second portions and made of a third material, the intermediate portion comprising a mesh of interlocking links with evenly spaced, uniform small openings between the links for allowing the first portion to bond directly to the second portion.

10. The composite cutting insert according to claim 9, wherein the links are circular in cross-sectional shape.

11. The composite cutting insert according to claim 9, wherein the third material of the intermediate portion has a higher shrinkage rate than the first and second composite materials.

12. The composite cutting insert according to claim 9, wherein the first portion comprises an upper surface, a lower surface, a plurality of side surfaces joining the upper surface and the lower surface, a cutting edge defined at the intersection between the upper surface and each of the side surfaces, and wherein the lower surface has a two-dimensional array of identical-shaped semi-circular grooves extending across from one side surface to an opposite side surface.

13. The composite cutting insert according to claim 12, wherein the second portion comprises an upper surface, a lower surface, a plurality of side surfaces joining the upper surface and the lower surface, wherein the upper surface has a two-dimensional array of identical-shaped semi-circular grooves extending across from one side surface to an opposite side surface.

14. A composite cutting insert, comprising:
- a first portion made of a first composite material;
- a second portion made of a second composite material; and
- an intermediate portion interposed between the first and second portions and made of a third material, the intermediate portion having a two-dimensional interlocking geometric shape for preventing movement of the first and second portions,
- wherein the third material of the intermediate portion has a higher shrinkage rate than the first and second composite materials.

15. The composite cutting insert according to claim 14, wherein the intermediate portion comprises a mesh of interlocking links with evenly spaced, uniform small openings between the links.

16. The composite cutting insert according to claim 14, wherein the links are circular in cross-sectional shape.

17. The composite cutting insert according to claim 14, wherein the first composite material has a different material property than the second composite material.

18. The composite cutting insert according to claim 14, wherein the first portion comprises an upper surface, a lower surface, a plurality of side surfaces joining the upper surface and the lower surface, and a cutting edge defined at the intersection between the upper surface and each of the side surfaces.

19. The composite cutting insert according to claim 18, wherein the lower surface has a two-dimensional array of identical-shaped semi-circular grooves extending across from one side surface to an opposite side surface.

20. The composite cutting insert according to claim 14, wherein the second portion comprises an upper surface, a lower surface, a plurality of side surfaces joining the upper surface and the lower surface.

21. The composite cutting insert according to claim 20, wherein the upper surface has a two-dimensional array of identical-shaped semi-circular grooves extending across from one side surface to an opposite side surface.

* * * * *